US007303810B2

(12) United States Patent
Goodson et al.

(10) Patent No.: US 7,303,810 B2
(45) Date of Patent: Dec. 4, 2007

(54) FIRE-RESISTANT ARCHITECTURAL RESIN MATERIALS

(75) Inventors: Raymond Lynn Goodson, Sandy, UT (US); R. Talley Goodson, Salt Lake City, UT (US); John C. Morley, West Lafayette, IN (US)

(73) Assignee: 3form, Inc., Salt Lake City, UT (US)

( * ) Notice: Subject to any disclaimer, the term of this patent is extended or adjusted under 35 U.S.C. 154(b) by 197 days.

(21) Appl. No.: 11/103,829

(22) Filed: Apr. 12, 2005

(65) Prior Publication Data

US 2005/0182167 A1  Aug. 18, 2005

Related U.S. Application Data

(63) Continuation-in-part of application No. 10/465,465, filed on Jun. 18, 2003, which is a continuation-in-part of application No. 10/086,269, filed on Mar. 1, 2002, now abandoned.

(60) Provisional application No. 60/579,004, filed on Jun. 11, 2004, provisional application No. 60/273,076, filed on Mar. 5, 2001.

(51) Int. Cl.
*B32B 7/02* (2006.01)
*B41M 5/00* (2006.01)
*C08G 18/77* (2006.01)

(52) U.S. Cl. ............... 428/212; 428/195.1; 428/203; 428/204; 428/213; 524/115

(58) Field of Classification Search ............ 428/195.1, 428/203, 204, 212, 213; 524/115
See application file for complete search history.

(56) References Cited

U.S. PATENT DOCUMENTS

| | | | |
|---|---|---|---|
| 2,660,824 A | 12/1953 | Neugass | |
| 3,255,781 A | 6/1966 | Gillespie | |
| 3,373,225 A | * 3/1968 | Degginger | ............. 523/516 |
| 3,465,062 A | 9/1969 | Holoch et al. | |
| 3,833,537 A | 9/1974 | Jaquiss | |
| 3,937,765 A | 2/1976 | Toy et al. | |
| 3,964,958 A | 6/1976 | Johnston | |
| 4,199,489 A | 4/1980 | Short | |
| 4,219,635 A | 8/1980 | Cooke | |
| 4,235,948 A | 11/1980 | Holmes | |
| 4,308,782 A | 1/1982 | Hartry | |
| 4,368,231 A | 1/1983 | Egert et al. | |
| 4,403,004 A | * 9/1983 | Parker et al. | ............. 428/31 |
| 4,443,581 A | 4/1984 | Robeson et al. | |
| 4,521,835 A | 6/1985 | Meggs et al. | |
| 4,543,292 A | 9/1985 | Giles, Jr. et al. | |
| 4,634,483 A | 1/1987 | Spengler | |
| 4,642,255 A | 2/1987 | Dlubak | |
| 4,648,690 A | 3/1987 | Ohe | |
| 4,656,080 A | 4/1987 | Takahashi et al. | |
| 4,900,611 A | 2/1990 | Carroll | |
| 4,921,755 A | 5/1990 | Carroll et al. | |
| 4,939,009 A | 7/1990 | Beavers et al. | |
| 5,073,421 A | 12/1991 | Akao | |
| 5,108,678 A | 4/1992 | Hirasaka et al. | |
| 5,192,609 A | 3/1993 | Carroll | |
| 5,221,569 A | 6/1993 | Rohrka et al. | |
| 5,277,952 A | 1/1994 | Watras | |
| 5,352,532 A | 10/1994 | Kline | |
| 5,364,926 A | 11/1994 | Sakashita et al. | |
| 5,413,828 A | 5/1995 | De Keyser | |
| 5,458,966 A | 10/1995 | Matsumoto et al. | |
| 5,496,630 A | 3/1996 | Hawrylko et al. | |
| 5,514,428 A | 5/1996 | Kunert | |

(Continued)

FOREIGN PATENT DOCUMENTS

DE   1694354   6/1971

(Continued)

OTHER PUBLICATIONS

Sergei V. Levchick and Edward D. Weil, A Review of Recent Progress in Phosphorous-Based Flame Retardants, Journal of Fire Sciences, v. 24, Sep. 2006, pp. 345-364, SAGE Publications.
Chemical Abstracts, vol. 116, No. 4, Jan. 27, 1992 Columbus, Ohio, US; abstract No. 22152, XP002126370.
Chemical Abstracts, vol. 122, No. 12, Mar. 20, 1995 Columbus, Ohio, US, abstract No. 134965.
Chemical Abstracts, vol. 117, No. 2, Jul. 13, 1992 Columbus, Ohio, US, abstract No. 9164.
Van Aert, H A M, et al. Poly(bsphenol A carbonate)-Poly(dimethyliloxane) multiblock copolymers, Polymer, Elsevier Science Publishers B.V, GB vol. 42, No. 5, Mar. 2001 pp. 1781-1788.
Article entitled "Standard Test Method for Surface Burning Characteristics of Building Materials," ASTM International; pp. 1-19; May 7, 2004.

*Primary Examiner*—Milton I. Cano
*Assistant Examiner*—Lawrence Ferguson
(74) *Attorney, Agent, or Firm*—Workman Nydegger

(57) ABSTRACT

A synthetic fire-resistant resin includes one or more of a polycarbonate resin material, and/or a polyester resin material mixed with a flame-retardant, such as a bis-diphenyl-diphosphate flame-retardant. Alternatively, a mixture of polycarbonate resin material mixed with polyester resin material can be capped with a fire-resistant film. The resin sheet can be made at a thickness such that the resin sheet is structurally useful as a conventional building material. Furthermore the resin sheet can be made transparent, translucent, or colored, as desired for architectural purposes. The resin sheet further has a Vicat temperature that renders the extruded resin sheet easy to work with using conventional manufacturing techniques, and strong enough to be used in a wide variety of indoor and outdoor environments. In one implementation, fire-resistant resin sheets can be combined with a decorative image layer to form a decorative panel that can be used in Class A building environments.

8 Claims, No Drawings

U.S. PATENT DOCUMENTS

| | | | |
|---|---|---|---|
| 5,605,751 A | 2/1997 | Suzuki et al. | |
| 5,643,666 A | 7/1997 | Eckart et al. | |
| 5,663,280 A | 9/1997 | Ogoe et al. | |
| 5,760,120 A * | 6/1998 | Itoh et al. | 524/431 |
| 5,776,838 A | 7/1998 | Dellinger | |
| 5,871,570 A | 2/1999 | Koyama et al. | |
| 5,894,048 A | 4/1999 | Eckart et al. | |
| 5,899,783 A | 5/1999 | Kimbrell, Jr. et al. | |
| 5,958,539 A | 9/1999 | Eckart et al. | |
| 5,998,028 A | 12/1999 | Eckart et al. | |
| 6,022,050 A | 2/2000 | Kline | |
| 6,025,069 A | 2/2000 | Eckart et al. | |
| 6,081,659 A | 6/2000 | Garza et al. | |
| 6,117,384 A | 9/2000 | Laurin et al. | |
| 6,136,441 A | 10/2000 | MacGregor et al. | |
| 6,187,699 B1 | 2/2001 | Terakawa et al. | |
| 6,221,939 B1 | 4/2001 | Campbell et al. | |
| 6,228,912 B1 * | 5/2001 | Campbell et al. | 524/100 |
| 6,319,432 B1 | 11/2001 | Harrod et al. | |
| 6,322,862 B1 | 11/2001 | Sakai | |
| 6,333,094 B1 | 12/2001 | Schneider et al. | |
| 6,369,141 B1 | 4/2002 | Ishii et al. | |
| 6,387,477 B1 | 5/2002 | Ogura et al. | |
| 6,388,046 B1 | 5/2002 | Campbell et al. | |
| 6,401,002 B1 | 6/2002 | Jang et al. | |
| 6,433,046 B1 | 8/2002 | Campbell et al. | |
| 6,445,969 B1 | 9/2002 | Kenney et al. | |
| 6,448,316 B1 | 9/2002 | Capitelli et al. | |
| 6,562,163 B1 | 5/2003 | Wellington | |
| 6,569,928 B1 | 5/2003 | Levchik et al. | |
| 6,569,929 B2 | 5/2003 | Falcone et al. | |
| 6,649,677 B2 * | 11/2003 | Jaatinen et al. | 524/227 |
| 6,685,993 B1 | 2/2004 | Hansson et al. | |
| 6,743,327 B2 | 6/2004 | Schober | |
| 6,780,905 B2 | 8/2004 | Bienmueller | |
| 6,969,745 B1 | 11/2005 | Taraiya et al. | |
| 7,114,737 B1 | 10/2006 | Rasmussen | |
| 2001/0016626 A1 | 8/2001 | Vollenberg et al. | |
| 2002/0019466 A1 | 2/2002 | Falcone et al. | |
| 2002/0032299 A1 | 3/2002 | Matsumoto et al. | |
| 2002/0115761 A1 | 8/2002 | Eckel et al. | |
| 2002/0122926 A1 | 9/2002 | Goodson | |
| 2002/0145276 A1 | 10/2002 | Viega | |
| 2003/0083408 A1 | 5/2003 | Bienmuller et al. | |
| 2003/0113485 A1 | 6/2003 | Schober | |
| 2003/0171494 A1 | 9/2003 | Aramaki et al. | |
| 2004/0039090 A1 | 2/2004 | Seidel et al. | |
| 2004/0053040 A1 | 3/2004 | Goodson et al. | |
| 2004/0127653 A1 | 7/2004 | Ellington et al. | |
| 2004/0202802 A1 | 10/2004 | Keeton et al. | |
| 2005/0049369 A1 | 3/2005 | O'Neil et al. | |

FOREIGN PATENT DOCUMENTS

| | | |
|---|---|---|
| DE | 2505326 | 8/1975 |
| DE | 2536654 | 2/1977 |
| DE | 4214383 | 11/1993 |
| DE | 29615956 | 11/1996 |
| DE | 10137930 | 2/2003 |
| EP | 0016617 | 10/1980 |
| EP | 0072626 | 2/1983 |
| EP | 0171730 | 2/1986 |
| EP | 0188791 | 7/1986 |
| EP | 0227922 | 7/1987 |
| EP | 0265171 B1 | 4/1988 |
| EP | 0278685 | 8/1988 |
| EP | 0365266 | 4/1990 |
| EP | 0372324 | 6/1990 |
| EP | 0470618 | 2/1992 |
| EP | 0491266 | 6/1992 |
| EP | 0537577 | 4/1993 |
| EP | 0582383 | 2/1994 |
| EP | 0587353 | 3/1994 |
| EP | 0626256 | 11/1994 |
| EP | 0637509 | 2/1995 |
| EP | 0638749 | 2/1995 |
| EP | 0668318 | 8/1995 |
| EP | 0680996 | 11/1995 |
| EP | 0728811 | 5/1996 |
| EP | 0731307 | 9/1996 |
| EP | 0742096 | 11/1996 |
| EP | 0795398 | 9/1997 |
| EP | 0754897 | 11/1997 |
| EP | 0899306 | 3/1999 |
| EP | 0909635 | 4/1999 |
| EP | 0928683 A2 | 7/1999 |
| EP | 0933256 | 8/1999 |
| EP | 1312472 | 5/2003 |
| EP | 01131378 B1 | 2/2005 |
| FR | 1388691 | 2/1965 |
| FR | 1555527 | 1/1969 |
| FR | 2194543 | 3/1974 |
| FR | 2237859 | 2/1975 |
| GB | 1461255 | 1/1977 |
| GB | 1517652 | 7/1978 |
| JP | 53083884 | 7/1978 |
| JP | 55135158 | 1/1981 |
| JP | 56123235 | 9/1981 |
| JP | 59123659 | 7/1984 |
| JP | 63022816 | 1/1988 |
| JP | 63194949 | 8/1988 |
| JP | 1206010 | 8/1989 |
| JP | 1249336 | 10/1989 |
| JP | 03143950 | 6/1991 |
| JP | 03285958 | 12/1991 |
| JP | 04214779 | 8/1992 |
| JP | 04224385 | 8/1992 |
| JP | 05293916 | 11/1993 |
| JP | 6031862 | 2/1994 |
| JP | 06220290 | 8/1994 |
| JP | 7125000 | 5/1995 |
| JP | 07126483 | 5/1995 |
| JP | 07195496 | 8/1995 |
| JP | 08085174 | 4/1996 |
| JP | 09277483 | 10/1997 |
| JP | 10175985 | 6/1998 |
| JP | 2002/161211 | 6/2002 |
| WO | WO93/22373 | 11/1993 |
| WO | WO93/22382 | 11/1993 |
| WO | WO96/08370 | 3/1996 |
| WO | WO97/22474 | 6/1997 |
| WO | WO98/29245 | 7/1998 |
| WO | WO99/07779 | 2/1999 |
| WO | 00012609 A1 | 3/2000 |
| WO | 00012611 A1 | 3/2000 |
| WO | 00012612 A1 | 3/2000 |
| WO | 00012614 A1 | 3/2000 |
| WO | WO00/24580 | 5/2000 |
| WO | WO00/27927 | 5/2000 |
| WO | WO03/023684 | 3/2003 |
| WO | 2005044906 A1 | 5/2005 |
| WO | 2006096196 A1 | 9/2006 |
| WO | 2006127219 A1 | 11/2006 |
| WO | 2006127222 A1 | 11/2006 |
| WO | 2006127231 A1 | 11/2006 |

* cited by examiner

FIRE-RESISTANT ARCHITECTURAL RESIN MATERIALS

CROSS-REFERENCE TO RELATED APPLICATIONS

The present invention claims the benefit of priority to U.S. Provisional Patent Application No. 60/579,004, filed on Jun. 11, 2004, entitled "Fire Resistant Architectural Resin Materials". The present invention is also a continuation-in-part of U.S. patent application Ser. No. 10/465,465, filed on Jun. 18, 2003, entitled "Laminate Structure with Polycarbonate Sheets and Method of Making", which is a continuation-in-part of U.S. patent application Ser. No. 10/086,269, filed on Mar. 1, 2002, now abandoned, entitled "Laminate Article and Method of Making Same", which claims priority to U.S. Provisional Patent Application No. 60/273,076, filed on Mar. 5, 2001, entitled, "Laminate Article and Method of Making Same". The entire contents of each of the aforementioned patent applications are incorporated herein by reference.

BACKGROUND OF THE INVENTION

1. The Field of the Invention

The present invention relates to methods and compositions for fire-resistant resin materials that can be used in architectural design applications.

2. Background and Relevant Art

Recent architectural designs have focused on synthetic, polymeric resins, which can be used as windows, partitions, walls, etc., in offices and homes. In particular, decorative polymeric resin materials (or "resins") are now particularly popular compared with decorative cast or laminated glass materials since decorative resins can be manufactured to be more resilient, and to have the same transparent, translucent, or colored appearance as cast or laminated glass, but with less cost. Decorative resins further provide more flexibility, compared with glass, in terms of color, degree of texture, gauge, and impact resistance. Furthermore, decorative resins have a fairly wide utility since they can be formed to include a wide variety of artistic colors and images. This flexibility applies both in the manufacturing phase, as well as in the post-manufacturing, or ultimate-use, phase.

Present polymeric resin materials generally used for creating decorative resin panels comprise polyvinyl chloride or "PVC"; polyacrylate materials such as acrylic, and poly(methylmethacrylate) or "PMMA"; polyester materials such as poly(ethylene-co-cyclohexane 1,4-dimethanol terephthalate), or "PET"; poly(ethylene-co-cyclohexane 1,4-dimethanol terephthalate glycol) or "PETG"; glycol modified polycyclohexylenedimethylene terephthalate, or "PCTG"; as well as polycarbonate materials. While each of the aforementioned resin materials can serve as an appropriate glass substitute, each resin material varies in physical properties from one material to the next. For example, polycarbonates, and polyesters (e.g., PETG, PCTG, and PET, also referred to as "copolyesters") are generally used in solid, extruded sheet form. An extruded resin sheet is generally a solid preformed sheet, such as a solid 4'×8' resin sheet (alternatively, 3'×5' sheet, 6'×10' sheet, etc.), which ultimately can form a surface of a decorative resin panel in final form.

One advantage of extruded materials, such as extruded polycarbonate, extruded PCTG, or extruded PETG, is that extruded resin sheets can be manipulated in one or more ways for a variety of design effects. For example, a colored or textured decorative panel, that is suitable for use as a building material, can be created by combining one or more transparent or translucent extruded resin sheets with one or more colored or textured fabrics. Alternatively, a decorative panel that is also suitable for use as a building material can be created by embedding certain three-dimensional objects between two or more transparent or translucent extruded resin sheets. Generally, these sorts of design modifications do not inhibit the strength of the decorative panel as a building material. As such, extruded resin materials can be both visually appealing, and structurally useful. Unfortunately, there is a reluctance to use resin materials in some cases due to fire safety concerns.

In some cases, synthetic resin materials can be made to have some fire-resistive properties by adding a flame-retardant to the resin material prior to extrusion. Generally, flame-retardant additives (or "flame-retardants") can be categorized by three basic mechanisms. For example, vapor phase flame-retardants work in the vapor phase by free radical flame poisoning, which removes active free radicals that promote further exothermic reactions. Example vapor-phase flame-retardants include halogenated materials (with or without the addition of antimony synergists). Solid-phase flame-retardants promote the formation of char in the solid phase to form an insulating layer. The insulating layer protects the flammable substrate from the fire, and reduces the emission of volatile flammable gases into the fire. Example solid-phase flame-retardants include phosphorus and silicone compounds. Heat sink flame-retardants work in endothermic reactions by releasing water and/or carbon dioxide, which quench the fire.

Some examples of making resin materials flame-retardant with certain additives include U.S. Pat. Nos. 5,258,432 and 5,204,394, which disclose combining phosphorous-based compounds (solid-phase) with resin materials such as polycarbonate mixtures. U.S. Pat. No. 5,109,044 discloses combining flame-retardants, such as haloaryl phosphates, with resin materials such as carbonate polymer blends. U.S. Pat. No. 5,663,260 discloses the use of low levels (less than about 1%) of phosphorus compounds with an alkali metal salt to achieve UL-94 (V2) in resin materials, such as polycarbonate resins. Unfortunately, as is understood from the foregoing and other examples, adding flame-retardant compounds to a resin material typically involves adding some fire-resistive properties to the resin material at the expense of other important architectural design properties, such as strength or translucence.

For example, a resin material can be made at least somewhat fire-resistant by adding a relatively large amount (ranging from about 5% to about 60%) of flame-retardant prior to extruding the resin material (i.e., forming an extruded resin sheet). A large amount of flame-retardant, however, can also have the effect of lowering—rather than raising—the melting point of the resin material. For PCTG or PETG, a preferred architectural design material, this has structural and design consequences that limit extruded PCTG or PETG panels to indoor use, or to outdoor use only in relatively cool climates. Furthermore, as previously described, a lower melting point can increase the fire risk associated with the resin material. In addition, a large majority of solid flame-retardants are opaque, such that most fire resistant panels are not sufficiently clear or translucent for architectural purposes. By contrast, those resin materials that are sufficiently useful for architectural applications, do not have enough fire-resistance properties to qualify the resin materials as suitable for "Class A" building environment.

In particular, most conventional architectural resin materials will melt or soften, such that they are unable to maintain minimum structural rigidity at the conditions identified by Class A standards. This poses a risk for not only architectural resin materials that would otherwise be used outdoors in a hot climate, but also, in the event of a fire, for resin materials used inside a building. Furthermore, the melted portions of such resin materials are sometimes more flammable than when solid, such that the resin materials can actually pose a greater fire and smoke hazard.

In general, "Class A" standards have the pertinent minimum requirements of a smoke density value of less than 450%-light absorption/minute, and a flame spread value of less than 25 ft/minute, over not less than a 10 minute span at a certain heat. Examples of this include the current versions (as of 2005) of the Underwriters Laboratories, Inc. 723 standard ("UL-723"), or the American Society for Testing and Materials E-84 standard ("ASTM-E84"), and so forth. Other related standards include the current (as of 2005) versions of the American National Standards Institute/National Fire Protection Association No. 255 ("ANSI/NFPA No. 255"), and Uniform Building Code No. 8 ("UBC No. 8"). (The foregoing standards or materials satisfying or articulating the minimum smoke and flame spread values stated above are hereinafter referred to generally as "Class A", "Class A standards" or "Class A materials".)

There are some resin materials that satisfy certain fire-rating standards under certain, modified conditions. Unfortunately, these fire-resistive resin materials usually have a number of limitations that make them undesirable for use in architectural and general building material contexts. For example, relatively thin decorative resin panels (e.g., $1/16^{th}$ of an inch thick or less) may be sufficiently translucent and fire-resistant in some cases, but do not have enough structural rigidity to have meaningful semi-structural and/or decorative architectural application. Furthermore, some resin manufactures have used an adjusted standard (e.g., a 3 minute smoke test, rather than the conventional 10 minute smoke test) to claim fire-resistance properties in a translucent resin.

While this might provide the manufacturer with some claim to fire resistance, the application context for materials passing only under a modified standard is nevertheless quite limited. Alternatively, the resin materials are not transparent or translucent—or cannot be easily made transparent or translucent—such that the resin materials cannot easily be colored, or modified to embed certain objects. It should be noted, in any event, that conventional resin materials typically do not pass the unmodified ASTM E-84 standard. As such, conventional resin materials, and even resin materials having claims to fire-resistance are generally unsuitable for architectural design purposes under actual, unmodified Class A fire safety guidelines.

Accordingly, an advantage in the art can be realized with architectural resin materials that meet relatively high fire standards, and maintain important aesthetic and structural properties, such as an appropriate degree of translucence, as well as strength. In particular, an advantage can be realized with visually appealing, translucent resin materials that qualify as a Class A fire resistant materials under conventional, unmodified testing guidelines.

BRIEF SUMMARY OF THE INVENTION

The present invention solves one or more of the foregoing problems in the prior art with compositions and methods for producing visually-appealing, fire-rated resin materials that are thicker and easier to use than otherwise available. In particular, resin materials in accordance with the present invention are suitable for use as a Class-A building material, and are suitable for a wide variety of semi-structural and decorative architectural design applications.

In one implementation, for example, a fire-resistive resin material composition comprises a mixture of at least one of a polyester material and a polycarbonate material, in any combination, and a flame-retardant material, such as an aromatic bis-diphenylphosphate flame-retardant. The flame-retardant material represents from about one-tenth to about one-third of the material composition, by weight (wt-%). The manufacturer ultimately compounds the flame-retardant and resin material composition. The manufacturer then forms the compounded composition through any of a variety of conventional processes into resin sheet, such as an extruded resin sheet, where the extruded resin sheet has a thickness suitable for use as a semi-structural or decorative architectural building material. The resulting resin sheet comprises an architecturally desirable resin product that qualifies as a Class A (e.g., ASTM E-84, and/or UL-723 or related test/standard—current as of 2005) material.

The resin material can also be "capped" with a flame-retardant film, thereby enhancing the fire-resistive properties, and/or scratch or chemical resistance of the resultant resin material. The flame-retardant and resin materials can also be compounded and extruded with one or more color additives, such that the compounded resin material is colored prior to being modified as a decorative material. In addition, two or more fire-resistant resin sheets can be combined with decorative materials to create a decorative architectural panel having appropriate fire resistant properties. Accordingly, the fire-resistant resin materials disclosed herein can be implemented in a wide variety of semi-structural and decorative architectural design applications where Class A materials are required.

Additional features and advantages of exemplary implementations of the invention will be set forth in the description which follows, and in part will be obvious from the description, or may be learned by the practice of such exemplary implementations. The features and advantages of such implementations may also be realized and obtained by means of the instruments and combinations particularly pointed out in the appended claims. These and other features will become more fully apparent from the following description and appended claims, or may be learned by the practice of such exemplary implementations as set forth hereinafter.

DETAILED DESCRIPTION OF THE INVENTION

The present invention extends to compositions and methods for producing visually-appealing, fire-rated resin materials that are thicker and easier to use than otherwise available. In particular, resin materials in accordance with the present invention are suitable for use as a Class-A building material, and are suitable for a wide variety of semi-structural and decorative architectural design applications.

For example, as will be understood herein, one or more flame-retardants can be added in one ratio to another given composition ratio of polymeric resin materials to form a resin sheet having suitable fire-resistance properties. Resin sheets in accordance with the present invention can be formed from such resin compositions via any number of conventional processes, such as by conventional extrusion, conventional injection molding, and the like. For purposes of simplicity, however, frequent reference is made herein to resin sheets formed via conventional extrusion processes.

The disclosed resin compositions and sheets are suited for a variety of purposes related to fire-resistance. For example, the resin compositions disclosed herein satisfy at least the standards articulated by the current (as of 2005) iterations of UL-723, ASTM E-84, USB No. 8 (e.g., 8-1, 8-2, etc.), and so forth, and are incorporated by reference herein. As stated, these standards have a minimum pertinent requirement of a smoke density value of less than 450%-light absorption/ minute, and a flame spread value of less than 25 ft/minute over 10 minutes at a specific temperature. Furthermore, the resin sheets can be made from the resin compositions at a relatively high gauge of thickness, e.g., greater than about one-sixteenth of an inch (e.g., about one-eighth of an inch or greater). With reference to metric measurements, other implementations of thickness are between about 0.13 mm and 12.7 mm.

In addition, the fire-resistant resin sheets are suitable for structural and decorative architectural uses. For example, the resin sheets disclosed herein are sufficiently strong for certain semi-structural uses. In addition, the fire-resistant resins are suitable for certain decorative architectural use in at least one aspect since they can be made translucent or transparent despite the addition of a relatively large amount of the one or more flame-retardants. This translucence carries a certain aesthetic, or decorative, property which, by itself, can be useful in decorative architectural purposes. The translucence, however, also allows fire-resistant resin panels in accordance with the present invention to have other decorative properties when combined with inks, color or image layers, and/or decorative object layers.

Accordingly, the present specification includes a number of resin compositions that can be formed to make a resin sheet in accordance with the present invention. The depicted compositions are described in terms of percentages by weight (wt-%), for purposes of convenience. Of course, one of skill in the art will realize that the volumetric conversions may be more suitable in some situations.

Suitable Flame-Retardants

In any of the implementations disclosed herein, a suitable flame-retardant can comprise the aromatic compounds bisphenol A-bis(diphenylphosphate) ("BAPP") or resorcinol bis(diphenylphosphate) ("RDP"). These bis-diphenyl-diphosphates have good compatibility and clarity when combined with a polyester or polycarbonate resin, even when the aromatic bis compounds comprise as much as 40 wt-% of the mixture by weight. In particular, fire resistant resins with even this amount of additive still allow resin panels in accordance with implementations of the present invention to allow light transmittance within about 5% to 15% of the light transmittance in a standard sample. Of course, non-aromatic flame-retardant compounds may also be used for each of these and the following examples, within the context of the present invention. As such, reference to BAPP or RDP is used for purposes of convenience, or in reference to use in a specific test. In particular, the flame-retardants discussed herein may be substituted with other flame-retardants having similar properties or chemical compositions.

Suitable Fire-Resistant Resin Compositions

In general, implementations of polyester resin compositions in accordance with the present invention comprise effective amounts (e.g., from about 3 wt-% to about 25 wt-%) of a flame-retardant, and from about 75 wt-% to about 97 wt-% of a polyester resin material, such as PCTG, PETG, or PET. For example, one polyester implementation comprises from about 3 wt-% to about 7 wt-% of flame-retardant (e.g., BAPP or RDP), and from about 93 wt-% to about 97 wt-% of a polyester resin material. Another implementation of a suitable fire-resistant resin product comprises from about 7 wt-% to about 15 wt-% of flame-retardant, and from about 85 wt-% to about 93 wt-% of a polyester resin material.

Still a further implementation comprises from about 15 wt-% to about 25 wt-% of a flame-retardant material, and about 75 wt-% to about 85 wt-% of a polyester material. These polyester implementations provide a clear, translucent, or transparent extruded resin sheet having a number of excellent fire-resistance properties, and having a suitable thickness. At least some of the polyester resin implementations remain sufficiently hard at higher temperatures, such that the given resin material is suited to virtually any building environment requiring a Class A building material.

In general, implementations of polycarbonate resin compositions in accordance with the present invention comprise effective amounts (e.g., from about 15 wt-% to about 45 wt-%) of a flame-retardant, and from about 55 wt-% to about 85 wt-% of a polycarbonate resin material. For example, one polycarbonate implementation of a suitable fire-resistant resin material comprises from about from about 15 wt-% to about 25 wt-% of flame-retardant material (e.g., BAPP or RDP), and about 75 wt-% to about 85 wt-% of polycarbonate resin material. Another implementation of a suitable fire-resistant resin material comprises between 25 wt-% to about 35 wt-% of flame-retardant material, and about 65 wt-% to about 75 wt-% of a polycarbonate resin material.

Still another implementation of a suitable fire-resistant resin material comprises from about 35 wt-% and about 45 wt-% of flame-retardant material, and about 55 wt-% to about 65 wt-% of polycarbonate. These polycarbonate implementations provide a clear, translucent, or transparent extruded resin sheet having a number of excellent fire-resistance properties, and having a suitable thickness. At least some of the polycarbonate resin implementations remain sufficiently hard at higher temperatures, such that the given resin material is suited to virtually any building environment requiring a Class A building material.

In general, implementations of combined polyester resin and polycarbonate resin compositions in accordance with the present invention comprise effective amounts (e.g., from about 5 wt-% to about 25 wt-%) of a flame-retardant (e.g., BAPP or RDP), from about 10 wt-% to about 43 wt-% of a polycarbonate resin material, and from about 45 wt-% to about 80 wt-% of a polyester resin material. For example, one implementation of a polyester and polycarbonate resin material combination comprises from about 10 wt-% to about 20 wt-% of polycarbonate resin, and from about 70 wt-% to about 80 wt-% of polyester resin. Another implementation comprises from about 5 wt-% and 15 wt-% of a flame-retardant, from about 10 wt-% and 20 wt-% of a polycarbonate resin material, and from about 70 wt-% to about 80 wt-% of a polyester resin material.

Still another implementation comprises from about 15 wt-% to about 25 wt-% of a flame-retardant, from about 25 wt-% to about 35 wt-% of a polycarbonate resin, and from about 45 wt-% to about 55 wt-% of a polyester resin. Yet still another implementation comprises from about 9 wt-% to about 19 wt-% of a flame-retardant, from about 33 wt-% and about 43 wt-% of a polycarbonate resin, and from about 45 wt-% and about 55 wt-% of a polyester resin. These combination polyester and polycarbonate implementations also provide a clear, translucent, or transparent extruded resin sheet having a number of excellent heat resistance properties, and having a suitable thickness. At least some of the combined polyester/polycarbonate resin implementations remain sufficiently hard at higher temperatures, such that the given resin material is suited to virtually any building environment requiring a Class A building material. In particular, such implementations using higher amounts of polyester are not necessarily too soft for use as a Class A material, in some implementations, due at least in part to the addition of polycarbonate.

Preparation of Compositions and Extruded Resin Sheets

The mixtures or compositions described herein can each be prepared in extruded resin form through any number of processes that include compounding the various materials, and putting the components through an extruder (e.g., a twin-screw extruder). The extruder can include injection mechanisms, and can include mechanisms for adding dyes during or at the end of the extrusion process, such that the resultant resin material is colored. The injection mechanisms can also be used to add translucent impact modifiers, such as translucent rubber materials, during (or at the beginning of) the extrusion process. For example, in one implementation, the manufacturer can ensure adequate mixing by injecting the flame retardant material (e.g., RDP, BAPP, etc.) into the polymeric resin after the polymeric resin has been passed through a reactor, but before being passed into a pelletizer. In one implementation, injection-based extruders allow the extruded resin sheet to be prepared at less cost than when using a conventional extruder.

In another implementation, the manufacturer can use a compounding extruder, which takes both flame retardant materials and polymeric resin materials, and mixes the materials to make compounded pellets. The compounded pellets are then passed through a sheet forming apparatus, such as an extruder. In some cases, this implementation can allow for as much as about 40% of adequately mixed flame retardant with the polymeric resin. In another implementation, the manufacturer can use mixing heads on an extruder while forming the polymeric resin sheets. The mixing heads can take the flame retardant materials, and mix the flame retardant materials with the polymeric resin before forming the combined materials into polymeric resin sheet. In some cases, the manufacturer can also add color to the polymeric and flame retardant materials prior to passing the materials through an extruder to form an extruded sheet.

After a given extruded resin sheet has been prepared, and/or cut to specifications, the extruded resin sheet can also be "capped" or laminated, using any number of fire-resistant films. At least two fire-resistant films comprise polyvinylchloride ("PVC") and polyvinylidenedifloride ("PVDF") capping films. Another such film that is commercially available is a TEDLAR PVF film made by Dupont. One will appreciate after reading this specification and claims that capping films can add yet an additional improvement in terms of a given resin material's fire-resistance, without substantially sacrificing visual or architectural appeal of the given resin material. Capping can also provide a number of ancillary benefits in terms of chemical and/or scratch resistance.

Testing of Materials

Varying mixtures of flame-retardant, polyester and/or polycarbonate resin material were prepared to test their minimum physical characteristics as a fire-resistant resin product, pursuant to identifying worthiness as a Class A building material. The corresponding mixtures were compounded with a conventional compounder (i.e., Berstorf 30 mm twin screw compounder), having a liquid injection side feeder. Pellets were prepared by strand-cutting the materials through a water bath. The pellets were then injection molded into plaques and bars, which would be suitable for simulating an actual environment. In each of the following resultant compositions, the resin plaques and bars had good clarity, with no evidence of any liquid additive bleed-out.

The plaques and bars were then subjected to the following, minimal physical requirement tests.

1. ASTM 2863 (Limiting Oxygen Index—"LOI").
   This test assesses the relative resistance to ignition of the materials. The higher the number the harder to ignite.
2. Small Scale Horizontal Burn Test ("HB").
   This test assesses the relative rate of flame spread propagation; as well as flaming drip formation when applying a prolonged flame source on the sample. (This is not a standard ASTM test; however, it was devised for this work. The results are averages of multiple tests.)
3. Vicat
   This test assesses the effect the given flame-retardant had on the resin material softening point. In at least one implementation, a suitable softening point for the fire-resistant resin material is from about 60° C. to about 90° C. In another implementation, a suitable softening point for the fire-resistant resin material is from about 75° C. to about 85° C.

The following examples set forth various polyester, polycarbonate, and/or polyester/polycarbonate resin compositions within the scope of the present invention. These examples are intended to be purely exemplary, and should not be viewed as limiting the scope of the invention.

EXAMPLE 1

Fire-resistant polyester compositions in accordance with the invention were made by mixing ingredients in the amounts listed below. The percentages are by weight:

| 1) | 0%  | RDP  | 100% | PETG |
| 2) | 5%  | RDP  | 95%  | PETG |
| 3) | 10% | RDP  | 90%  | PETG |
| 4) | 20% | RDP  | 80%  | PETG |
| 5) | 5%  | BAPP | 95%  | PETG |
| 6) | 10% | BAPP | 90%  | PETG |
| 7) | 20% | BAPP | 80%  | PETG |

The polyester resin compositions were then tested, as indicated herein, for fire-resistance.

TABLE 1

(Test Results for Polyester Resin Compositions)

|   | LOI (%) | HB (wt-%) burn length | HB (secs) time to self-extinguish | Vicat (° C.) |
|---|---------|----------------------|-----------------------------------|--------------|
| 1 | 25      | >50                  | >240                              | 81           |
| 2 | 29      | 16                   | 54                                | 69           |
| 3 | 28      | 18                   | 50                                | 60           |
| 4 | 29      | 16                   | 42                                | 44           |
| 5 | 28.5    | 16                   | 96                                | 72           |
| 6 | 29.5    | 10                   | 49                                | 65           |
| 7 | 29.5    | 10                   | 40                                | 53           |

Compared to the control (composition 1), the above-identified polyester resin compositions 2-7 show excellent properties with respect to ignition resistance, and with respect to propensity to burn. In particular, adding the identified flame-retardant to the polyester resin material provides the polyester resin material with excellent fire-resistance properties. Furthermore, a number of the polyester resin compositions are within, or substantially close to, at least one implementation of a generally appropriate Vicat range (RDP-based compositions are slightly lower than BAPP-based compositions). This makes the resulting resin material soft enough to be formable in general manufacturing processes. Accordingly, a number of the polyester resin compositions described herein are particularly suitable both for manufacturing purposes and for high temperature environments.

Each of the polyester resin compositions also shows excellent decorative architectural and semi-structural features. For example, the polyester resin compositions show excellent transparent and/or translucent properties, even at a relatively high thickness, and relatively high amounts of flame-retardant.

EXAMPLE 2

A number of the polyester compositions were further prepared with and without polyvinylchloride ("PVC") and polyvinylidenedifloride ("PVDF") capping films. Horizontal burn tests on these samples show that capping can further improve fire-resistance. In particular, capping decreases burn lengths, improves time for the given resin composition to self-extinguish, and improves the extent of dripping (as well as the formation of burning drips). In at least some implementations, capping comprising PVDF can provide somewhat better fire-resistance properties than capping comprising PVC.

EXAMPLE 3

Fire resistant polycarbonate compositions in accordance with the invention were made by mixing ingredients in the amounts listed below. The percentage values are by weight.

| 1) | 0%  | BAPP | 100% | Polycarbonate |
| 2) | 20% | BAPP | 80%  | Polycarbonate |
| 3) | 30% | BAPP | 70%  | Polycarbonate |
| 4) | 40% | BAPP | 60%  | Polycarbonate |

The polycarbonate resin compositions were then tested, as indicated herein, for fire-resistance.

TABLE 2

(Test Results for Polycarbonate Resin Compositions)

|   | BAPP % | Vicat ° C. | Std. Dev. |
|---|---|---|---|
| 1 | 0  | 150.2 | 0.2 |
| 2 | 20 | 95.9  | 0.2 |
| 3 | 30 | 74.2  | 0.3 |
| 4 | 40 | 57.7  | 0.9 |

Compared to the control (composition 1), the above-identified polycarbonate resin compositions 2-4 show excellent fire-resistance properties with respect to ignition resistance, and with respect to propensity to burn. Furthermore, as shown in Table 2, each of the polycarbonate resin compositions are within, or substantially close to, at least one implementation of a generally ideal Vicat range, making the polycarbonate resin compositions particularly suitable for manufacturing purposes, as well as for use in relatively hot environments. At least some of the compositions qualify as a Class A building material, as used herein.

Each polycarbonate resin composition in Example 3 also shows excellent decorative architectural features and semi-structural features. For example, the polycarbonate resin compositions show excellent transparent and/or translucent properties, even at a relatively high thickness, and relatively high amounts of flame-retardant. In particular, light transmittance test data with respect to the Example 3 Sample 2 plaque evidences the excellent light transmittance properties of this and one or more of the other Examples and Samples described herein.

Light Transmittance Test of Sample 2

A light transmission test was run on a nominal ⅛" plaque of Sample 2 (20% flame retardant) and compared to a ⅛" plaque of Sample 1 (0% flame retardant). The plaques were compared using a photometric system consisting of an ASTM E-662 NBS Smoke Chamber, which included a light source and photodetector mounted vertically. The light source comprised an incandescent lamp operated at a fixed voltage in a circuit, and powered by a constant voltage transformer. The light source provided a brightness temperature of 2200°+/−100° K. The photodetector comprised a photomultiplier tube with an S-4 spectral sensitivity response, and a dark current less than $10^{-9}$ A. The incandescent lamp was mounted in a sealed light-tight box, with optics to provide a collimated vertical light beam. The photodetector and associated optics were also mounted in the light-tight box directly opposite the incandescent lamp. The photodetector was connected to a photomultiplier recorder.

The Sample 1 plaque (control) was placed above the collimated light source, and a reading was obtained from the photomultiplier recorder. The process was then repeated for the Sample 2 plaque. The recorded numbers are as follows.

| Sample | Transmittance | Normalized Values |
|---|---|---|
| Control | 78.6% | 100% |
| FR sample | 73.2% | 93.1% |

Accordingly, this and other tests show that the a relatively large amount of flame retardant can be added to a polymeric resin sample in accordance with the teachings described herein, without sacrificing important aesthetic characteristics of the formed resin sheet. In particular, as much as about 20 wt-% to about 40 wt-% of flame retardant can be added in accordance with implementations of the present invention and still allow an extruded resin sheet to have excellent visual characteristics. For example, flame retardant polymeric resins as described herein have light transmittance that is within about 6% to about 15% of the normalized light transmittance of a standard control sample. This degree of translucence allows fire resistant polymeric resins to be employed for a wide range of architectural and construction uses.

EXAMPLE 4

Fire-resistant polyester resin compositions and polyester/polycarbonate resin compositions, in accordance with the invention, were made by mixing ingredients in the amounts listed below. The percentage values are by weight.

| 1) | 0% BAPP | 0% Polycarbonate | 100% PETG |
|---|---|---|---|
| 2) | 20% BAPP | 0% Polycarbonate | 80% PETG |
| 3) | 10% BAPP | 15% Polycarbonate | 75% PETG |
| 4) | 0% BAPP | 30% Polycarbonate | 70% PETG |
| 5) | 20% BAPP | 30% Polycarbonate | 50% PETG |

The polyester and/or combined polyester/polycarbonate resin compositions were then tested, as indicated herein, for Vicat softening points.

TABLE 3

(Test Results for PETG and PETG/Polycarbonate Resin Compositions)

|   | Vicat ° C. | Std. Dev. |
|---|---|---|
| 1 | 79.7 | 0.3 |
| 2 | 55.3 | 0.5 |
| 3 | 70.5 | 0.5 |
| 4 | 92.0 | 0.5 |
| 5 | 68.6 | 0.5 |

Compared to the control (composition 1), the above-identified polyester and/or polyester/polycarbonate resin compositions 2-5 show a Vicat softening point within acceptable ranges. That is, each of the identified flame-retardant/polycarbonate resin compositions are within, or substantially close to, at least one implementation of an ideal Vicat range (e.g., from about 60° C. and 90° C.). Thus, a manufacturer can add fire-resistance, as well as modify a Vicat point by varying the mixtures of polyester, polycarbonate, and flame-retardant.

As with the foregoing compositions in Examples 1, 2, and 3, each composition in Example 4 also shows excellent visual and semi-structural characteristics, such that the composition is suitable for use as a decorative architectural resin material. For example, the polyester/polycarbonate resin compositions show excellent transparent and/or translucent properties, even at a relatively high thickness. As such, each of the foregoing polyester/polycarbonate resin compositions can be used in a number of application for building materials.

EXAMPLE 5

Fire-resistant polyester resin compositions and polyester/polycarbonate resin compositions, in accordance with the invention, were made by mixing ingredients in the amounts listed below. The percentage values are by weight.

| 1) | 0% BAPP | 0% Polycarbonate | 100% PETG |
|---|---|---|---|
| 2) | 27% BAPP | 73% Polycarbonate | 0% PETG |
| 3) | 13.3% BAPP | 0% Polycarbonate | 86.7% PETG |
| 4) | 13.5% BAPP | 36.5% Polycarbonate | 50% PETG |

The compositions were then used to make corresponding extruded resin sheets at about 140 millimeters (5.5 inches) thick. In at least one case, the resulting resin sheets were capped (heat laminated) with a PVDF film. The resulting resin sheets were then cut to 8'×2' pieces for the ASTM E-84 test. Three extruded resin sheets (one for each resin material composition) were used for each test.

The polyester and/or combined polyester/polycarbonate resin compositions were then tested, as indicated herein, for fire-resistance properties such as flame density and smoke spread. In particular, the selected resin compositions were tested in comparison with the ASTM E-84 (Standard Method of Test for Surface Burning Characteristics of Building Materials) requirements. The standards outlined in the ASTM E-84 test are comparable to the standards outlined in the UL-723, ANSI/NFPA No. 255, and UBC No. 8 standards. In particular, these standards identify a Class A material at least in part as one that has a flame spread value of about 25 feet/minute or less, and a smoke density value of about 450%-light absorption/minute or less over a time period of not less then about 10 minutes. The summary of the ASTM E-84 test are presented in Table 4.

TABLE 4

(Test Results of Example 5 Materials)

|   | Flame Spread (ft/min) | Smoke Density (% light absorption/min) | Class A Pass/Fail |
|---|---|---|---|
| 1 | 40 | 320 | Fail |
| 2 | 10 | 385 | Pass |
| 3 | 15 | 340 | Pass |
| 4 | 25 | 360 | Pass |

Compared to the control (composition 1), the above-identified resin compositions 2 through 4 show significant fire-resistance properties with respect to flame spread, and with respect to smoke density. Considering these and other factors described herein, each of the above-identified resin material compositions, therefore, qualify as Class A building materials, consistent with the ASTM E-84, and UL-723 (and related) fire safety standards. Furthermore, each of the polycarbonate and/or polyester resin compositions are within, or substantially close to, at least one implementation of a generally ideal Vicat range. Accordingly, at least some of the resin compositions 2 though 4 are also particularly suitable for manufacturing purposes, as well as for use in relatively hot environments.

In addition, capping composition 2 in Example 5 maintains a flame spread value of about 10 in the composition, but drops the smoke density value of the composition from about 385 to about 255. Accordingly, this illustrates that a manufacturer can supplement the foregoing fire-resistance properties of compositions 2 through 4 using the capping films described herein.

As also with the foregoing compositions in Examples 1, 2, 3, and 4, each composition in Example 5 also shows excellent visual and semi-structural characteristics, with and/or without capping. Thus, the foregoing compositions are suitable for use as a decorative architectural resin material. For example, the resin compositions 2 through 4 show excellent transparent and/or translucent properties, even at a relatively high thickness.

In at least one implementation of use, for example, two translucent fire-resistant resin sheets can be combined with decorative materials to create a Class A decorative panel for use in architectural design environments. In particular, a first fire-resistant resin sheet as described herein can be positioned against a surface, and one or more decorative objects including thatch reed, straw, willow reed, grass, crushed rocks or glass, natural or synthetically created minerals, colored sheets or fabrics, twigs, branches, and so forth can be positioned thereon to form a decorative image layer. A second fire-resistant resin sheet can then be registered over the first fire-resistant resin sheet, and hence over the decorative materials, thereby creating a decorative fire-resistant resin sheet assembly.

The fire-resistant resin sheet can then be placed through a thermoforming press, which subjects the fire-resistant resin sheet assembly to a variety of appropriate temperatures and pressures for softening the first and second resin sheets together, and for removing gasses or air bubbles. The resultant decorative, fire-resistant resin panel (or decorative laminate structure) can then be prepared, sized, or cropped, as necessary for a particular application, and then positioned in place. The decorative objects can be seen through the translucent fire-resistant sheets, such that the decorative, fire-resistant resin panel (or decorative laminate structure) provides an aesthetically pleasing decorative panel, as well as an appropriately fire-resistant panel where Class A materials are required.

More particular descriptions for employing resin sheets with decorative panels are found in commonly-assigned U.S. patent application Ser. No. 10/465,465, entitled "Laminate Structure with Polycarbonate Sheet and Method of Making", as well as commonly-assigned U.S. patent application Ser. No. 10/821,307 "Architectural Laminate Panel with Embedded Compressible Objects and Methods for Making the Same". The entire specifications of both patent applications are incorporated by reference herein.

In addition, at least one of the fire-resistant resin samples described herein using about 20 wt-% flame retardant and about 80 wt-% polycarbonate was also passed through the University of Pittsburgh Test for Combustion Product Toxicity ("UPITT"), using the standards as of Jan. 31, 2005. This standard relates primarily to human toxicity of a material during a fire, and was tested using animal subjects as follows. In particular, an approximately 4 mm thick sample of the fire-resistant resin composition described was conditioned in solid form at approximately 50% relatively humidity for at least 48 hours before the test. The sample was then weighed immediately before being placed in a furnace on a weight sensor.

The test sample was incrementally heated at a rate of 20° C. per minute for 30 minutes, during which time the test animals, positioned for head only exposure, breathed the atmosphere generated. After a 10 minute post-exposure observation period, the animals were examined for survival and eye damage. Of note, the tested fire-resistant resin sample showed no little or no eye damage in the test subjects, met or exceeded expectations on other parameters, and thus qualified as a product that is "not more toxic than wood".

Accordingly, implementations of resin materials described herein can be used in a wide variety of semi-structural and decorative architectural design environments. Such environments include places or situations where Class A materials are required, or in environments where heat resistance may be appropriate (e.g., an outdoor building panel in a desert area). Such environments can also include places or situations where, in a burn environment, the materials are no more toxic than wood. This is true at least in part due to the Class A fire safety properties these materials exhibit, due to the lack of relative toxicity in a burn environment, and due at least in part to the thickness/gauge at which these materials can be made.

Furthermore, since these fire-resistant materials have generally ideal Vicat temperatures, the materials can be manufactured and formed to a variety of artistic structural formations relatively easily and efficiently. Still further, since the fire-resistant materials can be made at least substantially clear or translucent, the materials can easily be modified to exhibit a wide variety of artistic representations, textures, and color designs, such as when combined with other decorative object image layers, and/or with dyes, and so on. Yet still further, the compositions described herein can be modified with one or more components for improved scratch and or chemical resistance, as well as for impact resistance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A substantially translucent or transparent fire-resistant extruded resin sheet for use as decorative architectural Class A fire-resistant building material comprising:
   a polymeric resin composition comprising a mixture of about 75 to about 85 wt-% of a polyester resin material, and about 15 to about 25 wt-% of a polycarbonate resin material; and
   at least one of a PVC, PVF, and PVDF capping film formed about the resin sheet;
   wherein the resin sheet is a fire-resistant resin that is translucent or transparent.

2. The fire-resistant extruded resin sheet as recited in claim 1, wherein the fire-resistant resin sheet has a thickness that is greater than one-sixteenth of an inch.

3. The fire-resistant extruded resin sheet as recited in claim 1, wherein the extruded resin sheet has a thickness of greater than about one-sixteenth of an inch; and wherein the resin sheet allows light transmittance within about 15% of a normalized standard light transmittance of the polymeric resin composition.

4. A fire resistant, translucent or transparent decorative laminate structure having a decorative image layer thermoformed therein, the decorative laminate structure being suitable for use in a Class A building environment, comprising:
   a first and second fire-resistant resin sheet each comprising a resin composition including a copolyester ratio of about 45-55 wt-%, a polycarbonate ratio of about 30-40 wt-%, and a flame-retardant ratio of about 10-20 wt-% of A-bis(diphenylphosphate) or resorcinol bis(diphenylphosphate); and
   at least one decorative image layer between the first and second fire-resistant resin sheets;
   wherein the ratios of copolyester, polycarbonate, and flame-retardant are each selected to provide each of the first or second fire-resistant resin sheets with a light transmittance value that is within 15% of a normalized standard light transmittance of the polymeric component, and fire-resistance properties.

5. The fire-resistant resin sheet as recited in claim 4, wherein the fire-resistant resin sheet has a thickness that is greater than one-sixteenth of an inch.

6. A translucent or transparent, fire-resistant polymeric resin sheet that qualifies as a Class A building material, comprising:
   a first ratio of about 65 to about 75 wt-% of polycarbonate, wherein the ratio of polycarbonate is selected to provide the polymeric resin sheet with structural stability at a thickness greater than about one-sixteenth of an inch; and a second ratio of about 25 to about 35 wt-% of A-bis(diphenylphosphate) or resorcinol bis(diphenylphosphate) flame retardant, wherein the ratio of flame retardant is selected to provide the polymeric resin sheet with a flame spread value of less than about 25 feet per minute, and a smoke density value of less than about 450%-light absorption per minute after 10 minutes as measured by ASTM E-84;

wherein the polymeric resin sheet is transparent or translucent, and has a Vicat softening point of between about 50° C. to about 90° C.

7. A translucent or transparent, fire-resistant polymeric resin sheet that qualifies as a Class A building material, comprising:

a first ratio of about 85 to about 97 wt-% of copolyester, wherein the ratio of copolyester is selected to provide the polymeric resin sheet with structural stability at a thickness greater than about one-sixteenth of an inch; and a second ratio of about 3 to about 15 wt-% of A-bis(diphenylphosphate) or resorcinol bis(diphenylphosphate) flame retardant, wherein the ratio of flame retardant is selected to provide the polymeric resin sheet with a flame spread value of less than about 25 feet per minute, and a smoke density value of less than about 450%-light absorption per minute after 10 minutes as measured by ASTM E-84;

wherein the polymeric resin sheet is transparent or translucent, and has a Vicat softening point of between about 50° C. to about 90° C.

8. The fire-resistant polymeric resin sheet as recited in claim 7, wherein the polymeric component comprises about 85 to about 93 wt-% of the composition; and wherein the flame-retardant compound comprises about 7 to about 15 wt-% of the composition.

* * * * *

UNITED STATES PATENT AND TRADEMARK OFFICE
CERTIFICATE OF CORRECTION

| | | |
|---|---|---|
| PATENT NO. | : 7,303,810 B2 | Page 1 of 1 |
| APPLICATION NO. | : 11/103829 | |
| DATED | : December 4, 2007 | |
| INVENTOR(S) | : Goodson et al. | |

It is certified that error appears in the above-identified patent and that said Letters Patent is hereby corrected as shown below:

On the title page
Page 2
Insert the following Foreign Patent Document:
-- DE   1694354   1971-06-16 --

Column 4
Line 16, change "into resin sheet" to -- into a resin sheet --

Column 9
Line 27, change "bum" to -- burn --
Line 29, change "bum" to -- burn --

Column 10
Line 48, change "the a" to -- a --

Column 13
Line 47, change "showed no little" to -- showed little --

Signed and Sealed this

Fourteenth Day of April, 2009

JOHN DOLL
*Acting Director of the United States Patent and Trademark Office*